(12) United States Patent
Plantikow

(10) Patent No.: US 7,494,573 B2
(45) Date of Patent: Feb. 24, 2009

(54) EVAPORATOR TUBE FOR A SEA WATER DESALINATION SYSTEM

(75) Inventor: Ulrich Plantikow, Munich (DE)

(73) Assignee: Wme Gesellschaft Fur Windkraftbetriebene Meerwasserentsalzung MbH, Dranske/Rugen (DE)

( * ) Notice: Subject to any disclaimer, the term of this patent is extended or adjusted under 35 U.S.C. 154(b) by 623 days.

(21) Appl. No.: 10/510,073

(22) PCT Filed: Apr. 4, 2003

(86) PCT No.: PCT/DE03/01124

§ 371 (c)(1),
(2), (4) Date: Nov. 15, 2004

(87) PCT Pub. No.: WO03/085143

PCT Pub. Date: Oct. 16, 2003

(65) Prior Publication Data

US 2005/0161166 A1    Jul. 28, 2005

(30) Foreign Application Priority Data

Apr. 5, 2002    (DE) ................ 102 15 124

(51) Int. Cl.
*B01D 1/06* (2006.01)
*B01D 1/30* (2006.01)
*B01D 3/04* (2006.01)
*C02F 1/04* (2006.01)
*B01D 1/04* (2006.01)

(52) U.S. Cl. ............ 203/10; 159/27.1; 159/DIG. 15; 202/237; 202/267.1; 203/86; 203/100; 203/DIG. 17

(58) Field of Classification Search ............ 159/26.1, 159/27.1, DIG. 15; 202/237, 267.1; 203/10, 203/86, 100, DIG. 17
See application file for complete search history.

(56) References Cited

U.S. PATENT DOCUMENTS 2,966,340 A    12/1960    Chapman
3,766,019 A    10/1973    Tabata et al.
4,132,587 A     1/1979    Lankenau et al.
4,570,700 A *   2/1986    Ohara et al. ............. 165/134.1
5,967,097 A * 10/1999    Kastner et al. ............. 122/1 B
6,066,232 A     5/2000    Mohr et al.
2007/0215333 A1* 9/2007   Viklund et al. ............. 165/172

FOREIGN PATENT DOCUMENTS

| DE | 34 45 056 A1 | 6/1985 |
| DE | 41 10 695 A1 | 10/1992 |
| DE | 690 25 468 T2 | 7/1996 |
| DE | 196 07 828 A1 | 10/1996 |
| DE | 695 18 354 T2 | 4/2001 |
| EP | 0 342 574 A1 | 11/1989 |
| EP | 0 438 992 B1 | 7/1991 |
| EP | 0 683 241 B1 | 11/1995 |
| GB | 1 284 180 | 8/1972 |
| JP | A 4 335949 | 11/1992 |

OTHER PUBLICATIONS

C.W. Wegst; "Stahlschlussel"; Verlag Stahlschlussel Wegst Gmbh, Marbach; 2001, Nr. 120, S.485.

* cited by examiner

Primary Examiner—Virginia Manoharan
(74) Attorney, Agent, or Firm—Oliff & Berridge, PLC

(57) ABSTRACT

The invention relates to an evaporator tube for a sea water desalination system, whereby drinking water or water for domestic or industrial purposes, respectively, is extracted from the sea in particular in areas having scarce fresh-water resources. The evaporator tube of the invention is characterized by being formed of a steel that is sea water resistant and at the same time acid resistant, and by having a wall thickness between 0.1 mm and 0.5 mm. The evaporator tube of the invention may be furnished and utilized economically, and is characterized in particular by a high corrosion resistance at good heat transition owing to the thin wall, and by good resistance against low pH values. In addition, scaling on the evaporator tubes may reliably be prevented. It is therefore also suited for economical operation in intermittently operated sea water desalination systems such as, e.g., wind energy-powered sea water desalination systems.

11 Claims, No Drawings

EVAPORATOR TUBE FOR A SEA WATER DESALINATION SYSTEM

The invention relates to an evaporator tube for a sea water desalination system, whereby drinking water or water for domestic or industrial purposes, respectively, is extracted from the sea in particular in areas having scarce fresh-water resources.

In practice, various processes for sea water desalination by distillation have found acceptance. The known systems employed for this purpose are: multi-stage flash systems (MSF), multi-effect systems (ME), as well as mechanical (MVC) and thermal (TMC) vapor compression systems. In all of these, a plurality of evaporator tubes is employed for evaporating the sea water and for recovering the evaporation energy, which evaporator tubes are typically combined into a bundle of evaporator tubes of, e.g., approx. 1000 evaporator tubes. These evaporator tubes are installed either upright, as in the case of falling film evaporators, or also horizontally.

In operation, a sea water film is applied to the outer or inner side of the tube, and the steam thus generated is conducted to the other side of the tube where it condenses under a somewhat higher pressure, and thus also at a higher temperature. The condensation heat released in the process is conducted through the tube wall to the other side of the tube, where it results in the evaporation of a corresponding quantity of sea water from the film of sea water.

Due to the operating conditions, the evaporator tubes in all systems must be resistant against both sea water and distilled water, while at the same time enabling good heat transition. Under practical conditions, evaporator tubes of aluminum alloys and of alloys with copper, nickel and iron (CuNiFe tubes) have hitherto found acceptance. Both materials are characterized by good heat conductivity. Aluminum tubes are more cost-effective but may economically and lastingly only be used at temperatures of up to 60-70° C. at the most. With CuNiFe tubes, on the other hand, it is possible to obtain an improved sea water resistance at even higher temperatures owing to a higher proportion of nickel. With an increasing nickel proportion, however, the prices for these evaporator tubes also increase, reducing the economical efficiency of the sea water desalination system as a whole. The currently used evaporator tubes moreover usually have a wall thickness of 2 mm, which does have a positive influence on the service life of the tubes, but also determines the weight of the entire sea water desalination system in a considerable degree due to the large number of the required tubes. This substantially increases logistics expenditure for the construction of the like sea water desalination systems, particularly in remote areas.

Furthermore the requirements to corrosion resistance are particularly high if such sea water desalination systems are operated at various, non-constant operating conditions. As the practical experience with systems in accordance with DE 36 13 871 A1 has shown, both aluminum and CuNiFe tubes in wind energy-powered steam condensation systems for sea water desalination are subject to considerably more rapid corrosive attack than in corresponding, stationarily run systems with a constant energy supply. As a point of interest, corrosive attack in CuNiFe tubes on the distillate side was found to be considerably more intense than on the sea water side.

In addition, in wind energy-powered steam condensation systems for sea water desalination, the risk of scale formation on the evaporator tubes is substantially higher than in stationarily run systems, as has been found under practical conditions. This apparently is founded in the fact that the evaporator tubes run dry during periods of slacking or weak winds. The anti-scaling agents generally used by way of a countermeasure turned out to be inappropriate for solving this problem, for they are only insufficiently capable of delaying the formation of scale. An effective prevention of furring is currently only possible by purging the carbonate in the form of carbon dioxide by means of an acid prior to evaporation of the sea water. This does, however, result in the further problem that owing to errors in the apportioning of acid, an excessively high addition of acid has to be expected, with the evaporator tubes accordingly also having to be corrosion resistant even at low pH values.

It is an object of the invention to further develop an evaporator tube for a sea water desalination system in such a way that it overcomes at least one of the drawbacks of the prior art while furthermore being suited for use in intermittently operated sea water desalination systems.

This object is attained through an evaporator tube having the features of claim 1. Thus, in accordance with the invention, the tube is for the first time formed of a steel that is resistant against sea water, and at the same time is acid resistant, and has a wall thickness between 0.1 mm and 0.5 mm.

In particular, the invention for the first time takes leave from the hitherto prevailing prejudice that steel is not suited as a material for evaporator tubes in sea water desalination systems. Namely, it had hitherto merely been considered that only special, highly alloyed steels exhibit the required corrosion resistance at the conditions present in sea water desalination systems, with such steels usually having a very low heat conductivity. In accordance with the invention it has now been realized that it is nevertheless possible to use such a steel while clearly reducing the previously provided wall thicknesses of at least 2 mm without substantially impairing the stability of the arrangement. Thus the inherently existing drawback of a lower heat conductivity of this material is remedied by a reduction of the heat conduction distance. Moreover it was realized in the framework of the invention that heat transfer at the surfaces of the evaporator tubes to the steam or to the sea water is of a substantially greater importance for heat transfer from the distillate steam to the sea water film than heat conduction through the tube wall.

In accordance with one embodiment of the invention, it is now thus for the first time possible to also use evaporator tubes of steel for an economical operation of a sea water desalination system, which moreover results in a substantially higher corrosion resistance than was the case with the conventional evaporator tubes. As such steels are moreover more stable against lower pH values, they may advantageously also be used in systems where acid is added to the sea water prior to the evaporation process, whereby scaling on the evaporator tubes may reliably be prevented. The evaporator tube of the invention thus is also particularly well suited for wind energy-powered sea water desalination systems.

It is an additional, independent advantage that tubes of such steels are available at competitive pricing. The wall thickness of the evaporator tube of the invention is then limited to a minimum of about 0.1 mm because of the required mechanical stability. Such very thin tubes are particularly suited for systems where a higher pressure prevails in the tube cavity than on the outside, i.e., for systems where the distillate condenses on the inside of the tube.

Thanks to the advantageous strength properties of the like stainless steels when compared, e.g., with conventional CuNiFe materials, these may in accordance with an embodiment of the invention also be used in systems where a lower pressure prevails inside the tube cavity than on the outside. This is particularly the case with falling film evaporators.

Despite the low wall thickness, buckling of an evaporator tube may thus reliably and lastingly be avoided in accordance with the invention.

It is another additional, independent advantage that the weight of the evaporator tube and thus also of the bundle of evaporator tubes in a sea water desalination system may be kept low thanks to the wall thickness selected to be low in accordance with the invention.

The evaporator tube of the invention may thus be provided and used economically, and is characterized in particular by a high corrosion resistance at good heat transition thanks to the thin wall.

Advantageous further embodiments of the invention are subject matter of the appended claims.

Thus the evaporator tube may be formed of steel having material number 1.4565S in accordance with DIN EN 10 088-2 (USA: ASTM/UNS S 34565), being an extremely sea water resistant steel. Then even very thin evaporator tubes attain a sufficient service life of many years. This material, which exhibits a tensile strength Rm of 800-1000 N/mm$^2$ and an elongation at rupture of at least 30% and a 0.2% permanent elongation limit Rp 0.2 of at least 420 N/mm$^2$, carries the short designation X3CrNiMnMoNbN 23-17-5-3 and has yielded very good results in practical trials.

It was furthermore found to be most suitable in cases of usual applications if the wall thickness of the evaporator tube is between 0.2 mm and 0.3 mm. Such a wall thickness represents a good compromise between the functional requirements and the handling properties of such evaporator tubes.

It may furthermore be advantageous if the evaporator tube is formed of a sheet metal and produced by welding, for it may then be furnished at a particularly low cost. Such steel sheets or ribbons may be shaped in the desired manner at low technological expenditure, and welded in order to produce the tube structure. Here it is possible in particular by the use of an automatic laser welding technique to produce high-quality welded seams having a corrosion resistance on a par with that of the tube, so that the connection will not represent a weak point on the evaporator tube of the invention. The evaporator tube of the invention may thus be furnished at even lower cost.

Furthermore a tube end of the evaporator tube may be connected with a tube bottom comprised of the same kind of steel. This has the further advantage that the tube bottom necessary for mounting and guiding the evaporator tubes then has the same thermal expansion coefficient as the evaporator tube, and that there is no different corrosion potential, as would be the case with a use of two different metallic materials having a different standard electrode potential in the electrochemical series of metals. In practical experimentation it was found to be particularly advantageous and economical if the tube end is connected with the tube bottom by welding, preferably by laser welding. In the case of a sufficient wall thickness, the tube end may also be welded directly with the tube bottom. Here it should furthermore be considered that the tube bottom not only serves for mounting at the ends of the evaporator tubes, but by means of this tube bottom or of several ones of these tube bottoms, spaces for the evaporating sea water and the condensed distillate may be separated from each other. For this purpose, plastics or rubber seals are traditionally necessary between an evaporator tube and the recess in the tube bottom, which seals may be omitted thanks to welding of these components as provided in accordance with the invention. It was moreover found in practical experimentation that such welding produces a better and more reliable separation of the zones for sea water and distillate than was the case with the aid of seals. Thus the susceptibility to trouble may be reduced substantially in this way. An additional advantage resides in the fact that owing to the omission of the multiplicity of required seals in accordance with the number of evaporator tubes in the sea water desalination system, it is also possible to achieve a considerable cost advantage.

It may moreover be advantageous if the cross-section of the evaporator tube differs from a circular shape. In other words, the line of intersection for a cut perpendicular to the tube axis, or an oblique cut, may at least in places differ from the circular shape or from an elliptic shape, which may be brought about by shaping the tubes, e.g., by impressing continuous helices. This results in the generation of additional turbulences in the falling film, whereby the heat transfer may be improved. Another improvement of the heat transfer moreover results from the surface enlargement of the tube wall brought about by shaping. Through such shape changes in the evaporator tube, the falling film may moreover be deflected from the direction occasioned by gravity, which makes it difficult for the liquid film to be disrupted, and reduces the risk of a formation of dry spots not wetted by the falling film. In this way the efficiency of a sea water desalination system may be enhanced, and moreover the risk of scaling on the wall of an evaporator tube is reduced. Shaping of the tube wall preferably is carried out in such a manner that the installation of the evaporator tubes and their connection with the tube bottom is not made problematic. Such is the case, e.g., if the tube diameter in the shaped zone is not greater in any place than the diameter of the non-shaped tube, and/or if the zones intended for connection with the tube bottoms are not shaped.

The evaporator tube of the invention may thus excellently be employed in the known sea water desalination systems, optionally also by retrofitting. It moreover contributes to a substantial improvement of efficiency, reliability and durability of such a sea water desalination system.

In addition to the shown embodiment, the invention allows for further configurational approaches.

Thus it is also possible to use, instead of the steel having material number 1.4565S in accordance with DIN EN 10 088-2, another steel having similar properties. Examples herefor are the steels having material numbers in accordance with DIN EN 10 088-2 of 1.4439 (X2CrNiMoN 17-13-5, USA: UNS S31726) and 1.4539 (X1NiCrMoCu 25-20-5, USA: UNS N08904). Moreover it is also possible to employ austenitic stainless steels such as the so-called 6%-Mo steels, among which there are AL-6XN, 1925 hMo SB8, 25-6Mo, 254 SMO, 20Mo-6, YUS 170, 2419 MoN, B66, 3127 hMo, 654 SMO, among others (UNS No: N08367, N08932, N08926, S31254, N08026, N08925, S31266, N08031, S32654). Furthermore it is possible to use titanium or a titanium alloy as a material for the evaporator tube.

In addition to the embodiment as described, the invention allows for many other embodiments.

The invention claimed is:

1. An evaporator tube for a sea water desalination system, which is formed of a steel that is sea water resistant and at the same time acid resistant, and which has a wall thickness between 0.1 mm and 0.5 mm.

2. The evaporator tube in accordance with claim 1, having a wall thickness between 0.2 mm and 0.3 mm.

3. The evaporator tube in accordance with claim 2, wherein the cross-section of the evaporator tube differs from a circular shape.

4. The evaporator tube in accordance with claim 1, being formed by welding sheet steel in the form of a tube.

5. The evaporator tube in accordance with claim 4, wherein the cross-section of the evaporator tube differs from a circular shape.

6. The evaporator tube in accordance with claim 1, wherein a tube end of the evaporator tube is connected with a tube bottom consisting of a same steel type, by welding.

7. The evaporator tube in accordance with claim 6, wherein the cross-section of the evaporator tube differs from a circular shape.

8. The evaporator tube in accordance with claim 1, wherein the cross-section of the evaporator tube differs from a circular shape.

9. The evaporator tube in accordance with claim 1, wherein the cross-section of the evaporator tube differs from a circular shape.

10. A sea water desalination system comprising the evaporator tube according to claim 1.

11. A method for desalination of sea water comprising:
evaporating sea water on a first surface of the evaporator tube according to claim 1 to produce water vapor; and
condensing water vapor on a second surface of said evaporator tube.

* * * * *